US012631522B2

(12) United States Patent
Zhang et al.

(10) Patent No.: US 12,631,522 B2
(45) Date of Patent: May 19, 2026

(54) MULTI-SPECTRUM FUSION DECISION FAULT DIAGNOSIS METHOD FOR HIGH-SPEED ELECTRIC MULTIPLE-UNIT BEARING

(71) Applicant: XI'AN JIAOTONG UNIVERSITY, Shaanxi (CN)

(72) Inventors: Xingwu Zhang, Shaanxi (CN); Yanqi Li, Shaanxi (CN); Yilong Liu, Shaanxi (CN); Chuang Sun, Shaanxi (CN); Xuefeng Chen, Shaanxi (CN)

(73) Assignee: XI'AN JIAOTONG UNIVERSITY, Xi'an (CN)

( * ) Notice: Subject to any disclaimer, the term of this patent is extended or adjusted under 35 U.S.C. 154(b) by 322 days.

(21) Appl. No.: 18/400,915

(22) Filed: Dec. 29, 2023

(65) Prior Publication Data

US 2024/0369448 A1 Nov. 7, 2024

(51) Int. Cl.
G01M 13/045 (2019.01)
G01M 17/08 (2006.01)
(Continued)

(52) U.S. Cl.
CPC .......... G01M 13/045 (2013.01); G01M 17/08 (2013.01); G01M 99/005 (2013.01);
(Continued)

(58) Field of Classification Search
CPC .. G01M 13/045; G01M 17/08; G01M 99/005; G06F 2218/12; G06F 18/253;
(Continued)

(56) References Cited

U.S. PATENT DOCUMENTS

| 4,493,042 A | * | 1/1985 | Shima | F16C 19/52 |
| | | | | 702/35 |
| 5,566,092 A | * | 10/1996 | Wang | G05B 19/4184 |
| | | | | 706/912 |

(Continued)

FOREIGN PATENT DOCUMENTS

| CN | 109932179 A | * | 6/2019 | |
| CN | 111678678 A | * | 9/2020 | ............ G01M 13/00 |
| CN | 121009390 A | * | 11/2025 | |

*Primary Examiner* — Octavia Hollington

(57) ABSTRACT

A multi-spectrum fusion decision fault diagnosis method for a high-speed electric multiple-unit bearing, including the steps of collecting, by an acceleration sensor vibration acceleration signals of a high-speed electric multiple-unit; performing multi-method spectrum analysis on vibration acceleration signal data of a plurality of faults under a constant working condition, and marking the data to construct a spectrum data set; extracting inherent fault features of the spectrum data set to form a fault feature data set; performing weight fusion on spectrum fault features of different methods to construct a spectrum fault feature function, and fusing each set of spectra in the spectrum data set into a data point; using a criterion that a fisher discrimination ratio minimizes an intra-class spacing and maximizes an inter-class spacing to seek an optimal weight combination under the data set, so that fusion data points distinguish the different types of faults to a maximum degree.

9 Claims, 6 Drawing Sheets

(51) Int. Cl.
  *G01M 99/00*          (2011.01)
  *G06F 17/14*          (2006.01)

(52) U.S. Cl.
  CPC ........ G06F 17/145 (2013.01); *G06F 2218/08*
          (2023.01); *G06F 2218/12* (2023.01)

(58) Field of Classification Search
  CPC ........... G06F 18/2131; G06F 18/21324; G06F
          18/2431; G06F 2218/08; G06F 18/213;
                    G06F 17/145
  See application file for complete search history.

(56)                References Cited

U.S. PATENT DOCUMENTS

| | | | |
|---|---|---|---|
| 9,091,588 B2 * | 7/2015 | Lefler ..................... | G01H 13/00 |
| 10,520,397 B2 * | 12/2019 | Gao ..................... | G01M 99/008 |
| 10,725,439 B2 * | 7/2020 | Kozionov ............. | G06F 17/142 |
| 2023/0073415 A1 * | 3/2023 | Azarfar .............. | G01M 13/045 |
| 2023/0111673 A1 * | 4/2023 | Cella ................. | G05B 19/4183 |
| | | | 702/188 |
| 2024/0119113 A1 * | 4/2024 | Wang .................. | G01M 13/028 |
| 2024/0219900 A1 * | 7/2024 | Wang .................. | G05B 23/024 |

* cited by examiner

MULTI-SPECTRUM FUSION DECISION FAULT DIAGNOSIS METHOD FOR HIGH-SPEED ELECTRIC MULTIPLE-UNIT BEARING

CROSS-REFERENCE TO RELATED APPLICATION

This application claims priority from the Chinese patent application 2023104956263 filed May 6, 2023, the content of which is incorporated herein in the entirety by reference.

TECHNICAL FIELD

The present disclosure belongs to the field of mechanical fault diagnosis, and particularly relates to a multi-spectrum fusion decision fault diagnosis method for a high-speed electric multiple-unit bearing.

BACKGROUND

A traditional frequency domain analysis method has the advantages of good interpretability, a small calculation volume, a small parameter volume, etc., which fits well with practical needs of engineering, so it has been widely used in engineering. However, an existing frequency domain analysis method has two problems in processing fault diagnosis data in engineering: on the one hand, most methods carry out algorithm theoretical research under certain specific scenarios, and their scope of application is limited. Due to operation characteristics and work nature of a high-speed rail, its operation conditions change from time to time, and meanwhile, during the whole process of high-speed rail operation, the train runs not smoothly accompanying the whole process of high-speed rail operation, so its operation conditions also change at any time. For a fault diagnosis method with a single fault feature extraction angle, a diagnosis failure is very prone to happening when collected data are diagnosed and analyzed. On the other hand, the traditional frequency domain analysis method can only deal with a situation of a small volume of data, but with accumulation of data, the increase of a data volume will lead to insufficient use of data, thus missing other effective information. Because of these reasons, the diagnostic ability of the traditional frequency domain analysis method is greatly limited, which affects the accuracy and reliability of diagnosis.

Above information disclosed in the background part is used only to enhance the understanding of the background of the present disclosure and therefore may contain information that does not constitute prior art known to those ordinarily skilled in this field in the country.

SUMMARY

Aiming at the shortcomings of current traditional frequency domain analysis methods, the present disclosure aims to provide a multi-spectrum fusion decision fault diagnosis method for a high-speed electric multiple-unit bearing. Firstly, vibration acceleration signals collected by an acceleration sensor are marked and classified; frequency domain analysis is performed on a data set by selecting 4 frequency domain analysis methods of a Fourier spectrum, an envelope spectrum, a power spectrum and a fast spectral kurtosis-square envelope spectrum to construct a spectrum data set; fault features representing a spectrum diagnosis effect are extracted from the spectrum data set to construct a fault feature data set; a fault feature function is constructed to perform weight fusion on spectra of different methods to form fusion data points; a mode that a fisher discrimination ratio maximizes an inter-class spacing and minimizes an intra-class spacing is used to seek an optimal weight combination of the fusion data points to be used as a weight of a fusion spectrum, and an experience interval in which the fusion data points of different fault types fall is also summarized to be used to judge the fault types; and an optimal weight is adopted to perform fusion after spectrum analysis is performed on newly input data, a final fusion spectrum is formed, and a fault type of the fusion spectrum is judged according to numerical values of the fusion data points of the fusion spectrum.

In order to realize the above aims, the present disclosure proposes the following technical solution: a multi-spectrum fusion decision fault diagnosis method for a high-speed electric multiple-unit bearing includes the following steps:

step S100: collecting, by an acceleration sensor, vibration acceleration signals of the high-speed electric multiple-unit bearing, and performing classification according to fault types of the signals, the fault types totally including four classes of an inner ring fault, an outer ring fault, a rolling body fault and a holder fault;

step S200: performing analysis of 4 kinds of spectra of a Fourier spectrum, an envelope spectrum, a power spectrum and a fast spectral kurtosis-square envelope spectrum on the collected vibration acceleration signals respectively, to obtain a spectrum data set composed of different fault types and different spectrum analysis methods;

step S300: extracting strength of a fault feature frequency corresponding to a fault position from the spectrum data set according to a fault feature frequency of a monitored bearing as fault features, simplifying spectra in the spectrum data set based on the fault features, to obtain a fault feature data set composed of different fault types and different spectrum analysis methods, each piece of data in the fault feature data set being data based on the fault types respectively, and performing analysis of the Fourier spectrum, the envelope spectrum, the power spectrum, and the fast spectral kurtosis-square envelope spectrum on each piece of data in the fault feature data set, to obtain fault features extracted from the 4 kinds of spectra;

step S400: constructing a fault feature function by weight fusion of 4 fault features from the 4 kinds of spectra, and converting each piece of data in the fault feature data set into a fusion data point representing a fault type and a diagnosis effect of the data; and step S500: optimizing weights of the 4 fault features through a criterion that a fisher discrimination ratio maximizes an intra-class spacing and minimizes an inter-class spacing, to obtain an optimal weight combination of 4 classes of spectrum fault features in the fault feature dataset, and meanwhile obtaining a numerical interval formed by fusion data points after fusion of the different fault types to form an experience range for judging the fault types; and step S600: inputting test data, performing analysis of the Fourier spectrum, the envelope spectrum, the power spectrum, and the fast spectral kurtosis-square envelope spectrum on the test data, then performing weight fusion on the test data according to the optimal weight combination to form a fusion spectrum, extracting the fault features of the 4 kinds of spectra and performing weight fusion to form fusion data points, judging fault types of the fusion data points according to the experience range, and finally implementing fault diagnosis of the high-speed electric multiple-unit bearing.

In the method, in step S200, the spectrum data set is represented as:

$$\Theta_p = \left\{ \begin{array}{c} X_{1,p}^1(f), \ldots, X_{1,p}^k(f), \ldots, X_{1,p}^K(f) \\ X_{2,p}^1(f), \ldots, X_{2,p}^k(f), \ldots, X_{2,p}^K(f) \\ \ldots \\ X_{m,p}^1(f), \ldots, X_{m,p}^k(f), \ldots, X_{m,p}^K(f) \\ \ldots \\ X_{M,p}^1(f), \ldots, X_{M,p}^k(f), \ldots, X_{M,p}^K(f) \end{array} \right\}$$

$$\Theta = \{\Theta_1, \Theta_2, \ldots, \Theta_P\}$$

where, p represents a $p^{th}$ fault type, m represents an $m^{th}$ spectrum analysis method, k represents a $k^{th}$ piece of data under each fault type, m=1, 2, . . . , M, p=1, 2, . . . , P, k=1, 2, . . . , K, $\Theta_p$ represents a spectrum data set formed by data of the $p^{th}$ fault type, a frequency domain sequence after spectrum analysis on a $k^{th}$ group of data by adopting the $m^{th}$ method is denoted as $$X_m^k(f), f = 1, \ldots N, f$$

is a sequence number of the vibration acceleration signals, a length of the sequence number is N, and meanwhile, in order to avoid an influence of a difference of spectrum magnitude orders of different methods on results, normalization processing is performed on the above spectra.

In the method, in step S300, a step of extracting fault features of corresponding positions of the spectra from the spectrum data set to construct the fault feature data set is as follows:

a fault feature frequency of a bearing at a monitoring position is $f_p$, p=1, . . . P, and for a spectrum $$X_{mp}^k(f),$$

a fault feature $$h_{m,p}^k$$

extracted from the spectrum is:

$$h_{m,p}^k = \sum_{l=1}^{L} a_p^l \times f_p^2,$$

where, $$a_p^l$$

is an amplitude of an $1^{th}$ harmonic wave of a fault feature frequency $f_p$, L is the number of frequency multiplications to be detected, $$h_{m,p}^k$$

is the fault feature extracted from a spectrum of the $k^{th}$ group of data of the $m^{th}$ method in the $p^{th}$ fault, and the spectrum data set $\Theta$ is simplified as:

$$\Gamma_p = \left\{ \begin{array}{c} h_{1,p}^1, h_{1,p}^2, \ldots, h_{1,p}^k, \ldots h_{1,p}^K \\ h_{2,p}^1, h_{2,p}^2, \ldots, h_{2,p}^k, \ldots h_{2,p}^K \\ \ldots \\ h_{m,p}^1, h_{m,p}^2, \ldots, h_{m,p}^k, \ldots h_{m,p}^K \\ \ldots \\ h_{M,p}^1, h_{M,p}^2, \ldots, h_{M,p}^k, \ldots h_{M,p}^K \end{array} \right\}$$

$$\Gamma = \{\Gamma_1, \Gamma_2, \ldots, \Gamma_p, \ldots \Gamma_P\},$$

where, $\Gamma_p$ represents a $p^{th}$ class of fault feature data set extracted from a $p^{th}$ class of fault type spectrum data set $\Theta_p$, and $\Gamma$ represents a simplified global fault feature dataset.

In the method, in step S400, the constructed fault feature function is represented as:

$$S_p^k = \sum_{m=1}^{M} \omega_m \times h_{m,p}^k$$

where, $$S_p^k$$

is a fault feature function of a $k^{th}$ piece of data in the $p^{th}$ fault type, and its meaning is a fusion data point formed by weight fusion of different spectrum features.

In the method, in step S500, the criterion of the fisher discrimination ratio is represented as:

$$C = \sum_{p=1}^{P} \sum_{l \neq p}^{P} \frac{(m_p - m_l)^2}{s_p^2 + s_l^2} = \frac{\omega^T S_b \omega}{\omega^T S_w \omega},$$

in the formula, P represents P kinds of different fault types, $\omega$ is a projection direction, that is a weight matrix of the fusion spectrum, where $\omega=[\omega_1, \omega_2, \ldots \omega_M]^T$, $m_p$ and $m_l$ represent an intra-class mean value of a $p^{th}$ class, and an intra-class mean value of an $1^{th}$ class respectively, $s_p$ and $s_l$ represent an intra-class variance of the $p^{th}$ class, and an intra-class variance of the $1^{th}$ class respectively, $S_b$ represents a total inter-class dispersion matrix, and $S_w$ represents a total intra-class dispersion matrix.

In the method, optimizing the weights of the 4 fault features through the criterion that the fisher discrimination ratio maximizes the intra-class spacing and minimizes the inter-class spacing includes:

S501: solving the total intra-class dispersion matrix $S_w$ after projection according to an intra-class mean value and each intra-class data point of the fault feature set $\Gamma$:

$$S_w = \sum_{p=1}^{P} v_p$$

$$v_p = \sum_{k=1}^{K} (S_p^k - m_p)(S_p^k - m_p)^T$$

where, in the formula, $v_p$ represents an intra-class dispersion of a $p^{th}$ class of fault data, and the fault feature function is substituted into the above formula to obtain:

$$v_p = \sum_{k=1}^{K} \left( \sum_{m=1}^{M} \omega_m h_{m,p}^k - \frac{\sum_{k=1}^{K}\sum_{m=1}^{M} \omega_m h_{m,p}^k}{K} \right)\left( \sum_{m=1}^{M} \omega_m h_{m,p}^k - \frac{\sum_{k=1}^{K}\sum_{m=1}^{M} \omega_m h_{m,p}^k}{K} \right)^T$$

$$= \frac{\omega^T}{K}\left( \sum_{k=1}^{K}(KU_{p,k} - \Lambda_p 1)(KU_{p,k} - \Lambda_p 1)^T \right)\omega$$

$$\Lambda_p = \begin{bmatrix} f_{1,p,1} & f_{1,p,2} & \cdots & f_{1,p,k} \\ f_{2,p,1} & & & f_{2,p,k} \\ \cdots & & & \cdots \\ f_{M,p,1} & f_{M,p,2} & \cdots & f_{M,p,k} \end{bmatrix}$$

where, $U_{p,k}=[h_{1,p,k}, h_{2,p,k}, \ldots, h_{M,p,k}]^T$ and $1=[1, 1, \ldots 1]^T$ are column vectors with elements being 1;

S502: solving the total inter-class dispersion matrix $S_b$ after projection according to the intra-class mean value and each intra-class data point of the fault feature set $\Gamma$:

$$S_b = \sum_{p=1}^{P}\sum_{l \neq p}^{P} (m_p - m_l)(m_p - m_l)^T$$

$$S_b = \sum_{p=1}^{P}\sum_{l \neq p}^{P} \left( \frac{\sum_{k=1}^{K}S_p^k - \sum_{k=1}^{K}S_l^k}{K} \right)\left( \frac{\sum_{k=1}^{K}S_p^k - \sum_{k=1}^{K}S_l^k}{K} \right)^T$$

$$= \sum_{p=1}^{P}\sum_{l \neq p}^{P} \left( \frac{\sum_{k=1}^{K}\sum_{m=1}^{M}\omega_m h_{m,p}^k - \sum_{k=1}^{K}\sum_{m=1}^{M}\omega_m h_{m,p}^k}{K} \right)\left( \frac{\sum_{k=1}^{K}\sum_{m=1}^{M}\omega_m h_{m,p}^k - \sum_{k=1}^{K}\sum_{m=1}^{M}\omega_m h_{m,p}^k}{K} \right)^T$$

$$= \frac{1}{K^2}\sum_{p=1}^{P}\sum_{l \neq p}^{P} \left( \sum_{k=1}^{K}\sum_{m=1}^{M}\omega_m h_{m,p}^k - \sum_{k=1}^{K}\sum_{m=1}^{M}\omega_m h_{m,p}^k \right)\left( \sum_{k=1}^{K}\sum_{m=1}^{M}\omega_m h_{m,p}^k - \sum_{k=1}^{K}\sum_{m=1}^{M}\omega_m h_{m,p}^k \right)^T$$

$$= \frac{1}{K^2}\omega^T \left( \sum_{p=1}^{P}\sum_{l \neq p}^{P}(\Lambda_p - \Lambda_l)(\Lambda_p - \Lambda_l)^T \right)\omega$$

and S503: solving an optimal projection direction $\omega^T$, seeking a maximum value of a discrimination ratio c, and in order to solve the discrimination ratio c, introducing a Lagrange operator $\lambda$ here, then solving of the discrimination ratio C being able to be converted into:

$$\max_{\omega}(\omega^T S_b \omega), \text{ s.t. } \omega^T S_w \omega = c \neq 0$$

$$L(\omega, \lambda) = \omega^T S_b \omega - \lambda(\omega^T S_b \omega - c)$$

and after solving a partial derivative of w, obtaining the following formula:

$$S_b \omega^* - \lambda S_w \omega^* = 0$$

hereby, obtaining an optimal projection direction, that is, an optimal spectrum weight $\omega^*$, and performing normalization processing on the optimal spectrum weight, to obtain the most suitable spectrum weight combination on the fault feature data set.

In the method, in step S500, the optimal fusion data obtained after acquiring the optimal weight combination is represented as:

$$St_p^k = \sum_{m=1}^{M}\omega_m \times h_{m,p}^k = \omega^* \cdot U_{p,k}$$

for the $p^{th}$ class of faults, a mean value of the fusion data points of the $p^{th}$ class of faults is $$\bar{m}_p = \frac{\sum_{k=1}^{K} St_p^k}{K},$$

and an interval range in which the data points fall after the faults are fused may be represented by minimum and maximum values of the data points of such class of faults, that is, an interval of the fusion data points of the $p^{th}$ class of faults may be represented as $$\lambda_p = [\min(St_p^k), \ \max(St_p^k)].$$

In the method, in step S600, the obtained fusion spectrum needs to perform analysis of four kinds of spectra of the Fourier spectrum, the envelope spectrum, the power spectrum, and the fast spectral kurtosis-square envelope spectrum on input data to be diagnosed respectively, frequency domain sequences after amplitude normalization on the four kinds of spectra are denoted as $X_1(f)$, $X_2(f)$, $X_3(f)$ and $X_4(f)$ respectively, where f represents a corresponding frequency of the frequency domain sequences, and the fusion spectrum is denoted as:

$$X(f) = \sum_{m=1}^{M} w_m^* \cdot X_m(f)$$

where, M is 4, $w^*[w_1^*, w_2^*, \ldots, w_m^*, \ldots, w_M^*]$, and fault diagnosis of a high-speed rail bogie bearing is realized by judging a fault feature frequency amplitude in the fusion spectrum.

The method, in step S600, when spectrum analysis of newly input data is performed and a fusion data point $S_{test}$ falls in an interval $\lambda_p$, it is judged that data is of the $p^{th}$ class of fault type, if fusion value intervals of different types of faults overlap and a newly input data point just falls in an overlapping interval, a relatively-close point may be selected as a judgment conclusion according to an absolute value of a difference value between the fusion data point and the mean value $$\bar{m}_p,$$

and when $S_{test}$ falls in an overlapping interval $p, l \in [1,P]$ of a fusion data interval $\lambda_p$ of the $p^{th}$ class of faults and a fusion data interval $\lambda_l$ of the $l^{th}$ class of faults, if $$|S_{test} - \bar{m}_l| < |S_{test} - \bar{m}_p|,$$

a fault is judged to be the $l^{th}$ class of faults, otherwise, the fault is judged to be the $p^{th}$ class of faults.

Compared with the prior art, the present disclosure has the beneficial effects that: for fault diagnosis needs of the high-speed electric multiple-unit bearing, the multi-spectrum fusion decision fault diagnosis method of the present disclosure may provide a fault diagnosis method with strong robustness and good anti-interference. The method combines the advantages of a traditional machine learning and frequency method, can not only fully mine data set information, but also reduce information omission, and may also adaptively give different weights to spectra with different effects for different data sets to form the fusion spectrum with strong stability and high reliability; and the method may also summarize a known fault class fusion data range according to the fused fault feature data points to judge the fault classes, which finally realizes the fault diagnosis of the high-speed electric multiple-unit bearing.

Figure 1:
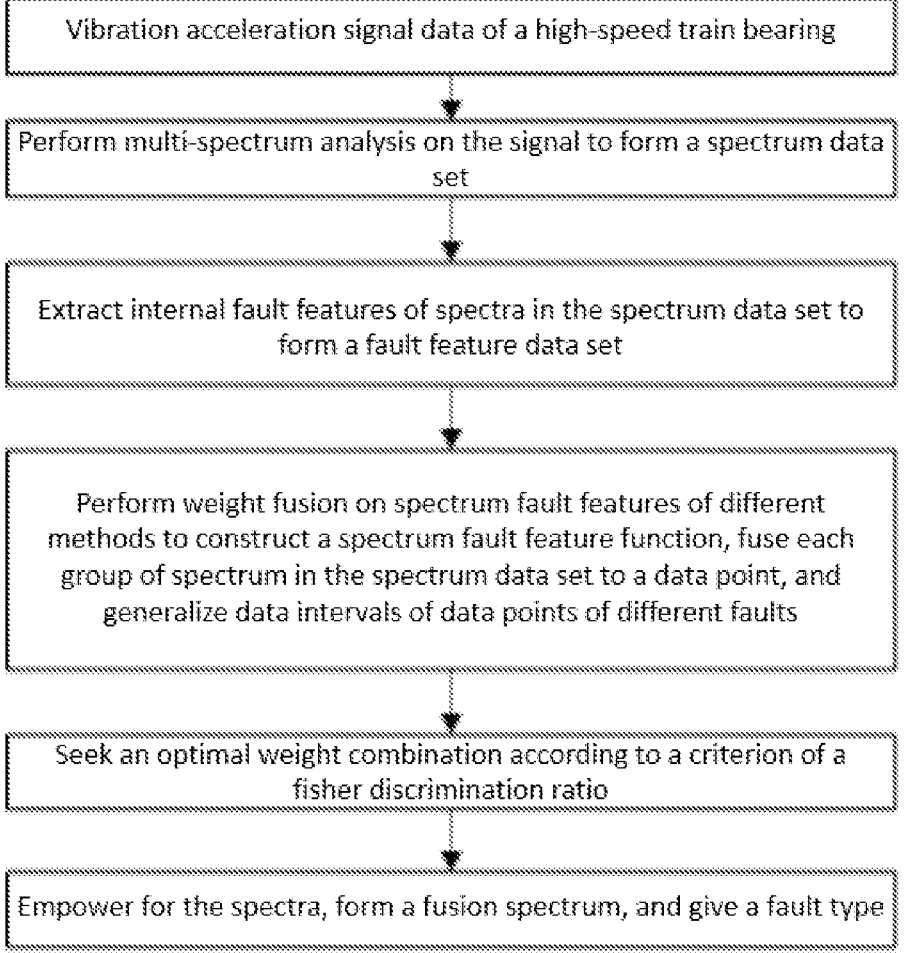
FIG. 1 is a flow diagram of a multi-spectrum fusion decision fault diagnosis method for a high-speed electric multiple-unit bearing provided by an embodiment of the present disclosure.

The present disclosure is further explained in combination with accompanying drawings and embodiments.

DETAILED DESCRIPTION

Specific embodiments of the present disclosure will be described in more detail with reference to accompanying drawings below. Although the specific embodiments of the resent disclosure are shown in the accompanying drawings, it should be understood that the present disclosure may be realized in various forms and should not be limited by the embodiments set forth herein. Rather, these embodiments are provided to enable the present disclosure to be understood a more thoroughly and to enable a range of the present disclosure to be completely communicated to those skilled in the art.

It should be noted that certain vocabularies are used in the specification and claims to refer to specific components. It should be understood by those skilled in the art that technicians may call the same component with different nouns. The present specification and the claims are not based on differences of the nouns as a mode of distinguishing components, but are based on differences in functions of the components as a distinction criterion. If "comprising" or "including" mentioned throughout the entire specification and claims is used as an open-ended term, it should be interpreted as "including but not limited to". The specification is subsequently described as a better implementation of implementing the present disclosure, but the description is for the purpose of a general principle of the specification and is not intended to limit the scope of the present disclosure. The scope of protection of the present disclosure shall be as defined in the attached claims.

In an embodiment, as shown in FIG. 1 to FIG. 8, the present disclosure provides a multi-spectrum fusion decision fault diagnosis method for a high-speed electric multiple-unit bearing, including the following steps:

S100: vibration acceleration signals of the high-speed electric multiple-unit bearing are collected through an acceleration sensor; and S200: analysis of a Fourier spectrum, an envelope spectrum, a power spectrum and a fast spectral kurtosis-square envelope spectrum is performed on the collected vibration acceleration signals respectively, to obtain a spectrum data set composed of different fault types and different spectrum analysis methods.

In the step, the constructed spectrum data set may be represented as:

extracted from the spectrum is:

$$\Theta_p = \left\{ \begin{array}{c} X_{1,p}^1(f), \ldots, X_{1,p}^k(f), \ldots, X_{1,p}^K(f) \\ X_{2,p}^1(f), \ldots, X_{2,p}^k(f), \ldots, X_{2,p}^K(f) \\ \ldots \\ X_{m,p}^1(f), \ldots, X_{m,p}^k(f), \ldots, X_{m,p}^K(f) \\ \ldots \\ X_{M,p}^1(f), \ldots, X_{M,p}^k(f), \ldots, X_{M,p}^K(f) \end{array} \right\}$$

$$\Theta = \{\Theta_1, \Theta_2, \ldots, \Theta_P\}$$

where, p represents a $p^{th}$ fault type, m represents an $m^{th}$ spectrum analysis method, k represents a $k^{th}$ piece of data under each fault type, m=1, 2, . . . , M, p=1, 2, . . . , P, k=1, 2, . . . , K, $\Theta_p$, represents a spectrum data set formed by data of the $p^{th}$ fault type, a frequency domain sequence after spectrum analysis on a $k^{th}$ group of data by adopting the $m^{th}$ method is denoted as $$X_m^k(f), f = 1, \ldots N, f$$

is a sequence number of the vibration acceleration signals, and a length of the sequence number is N.

Before model training, it is necessary to conduct spectrum analysis and processing on classified data, and label and classify the spectra according to its fault types and frequency domain analysis methods, so as to facilitate obtaining an optimal weight by a subsequent trained model.

Exemplarily, the vibration acceleration signals mentioned in step S001 and step S002 may be time domain signals whose object is the high-speed electric multiple-unit bearing, its amplitude changes with time, and different signals correspond to different pieces of information of fault types and fault degrees.

Specifically, the fast spectral kurtosis-square envelope spectrum method mentioned in step S200 represents the use of a square envelope spectrum method to perform spectrum analysis on a resonance frequency band preferred by fast spectral kurtosis, so as to improve fault feature frequency clarity in the spectrum.

S300: strength of a fault feature frequency corresponding to a fault position is extracted from the spectra according to a fault feature frequency of a monitored bearing as fault features, so that the spectra in the spectrum data set are simplified, to obtain a fault feature data set composed of different fault types and different spectrum analysis methods.

In the step, the step of extracting fault features of corresponding positions of the spectra from the spectrum data set to construct the fault feature data set is as follows:

a fault feature frequency of a bearing at a monitoring position is $f_p$, p=1, . . . P, and for a spectrum $$X_{m,p}^k(f),$$

a fault feature $$h_{m,p}^k$$

$$h_{m,p}^k = \sum_{l=1}^{L} a_p^l \times f_p^2,$$

where, $$a_p^l$$

is an amplitude of an $l^{th}$ harmonic wave of the fault feature frequency $f_p$, L is the number of frequency multiplications to be detected, and $$h_{m,p}^k$$

is the fault feature extracted from a spectrum of the $k^{th}$ group of data of the $m^{th}$ method in the $p^{th}$ fault. Therefore, the spectrum data set $\Theta$ constructed in the step S200 may be simplified as:

$$\Gamma_p = \left\{ \begin{array}{c} h_{1,p}^1, h_{1,p}^2, \ldots, h_{1,p}^k, \ldots h_{1,p}^K \\ h_{2,p}^1, h_{2,p}^2, \ldots, h_{2,p}^k, \ldots h_{2,p}^K \\ \ldots \\ h_{m,p}^1, h_{m,p}^2, \ldots, h_{m,p}^k, \ldots h_{m,p}^K \\ \ldots \\ h_{M,p}^1, h_{M,p}^2, \ldots, h_{M,p}^k, \ldots h_{M,p}^K \end{array} \right\}$$

$$\Gamma = \{\Gamma_1, \Gamma_2, \ldots, \Gamma_p, \ldots \Gamma_P\},$$

$\Gamma_p$ represents a $p^{th}$ fault feature data set extracted from a $p^{th}$ fault type spectrum data set $\Theta_p$, $\Gamma$ represents a simplified global fault feature dataset, which represents a fault diagnosis effect of each spectrum in the spectrum data set, meanwhile, in order to avoid the influence of spectrum magnitude order differences of different methods on the results, the above spectrum is normalized.

S400: At this time, each piece of data in the fault feature data set corresponds to 4 fault features, which are respectively from four kinds of spectra of Fourier spectrum, envelope spectrum, power spectrum and fast spectral kurtosis-square envelope spectrum analysis constructing, a fault feature function is constructed by weight fusion of 4 fault features, and each group of data in the data set is converted into a data point representing a fault type and a diagnosis effect of the data.

In the step, the constructed fault feature function may be represented as:

$$S_p^k = \sum_{m=1}^{M} \omega_m \times h_{m,p}^k$$

where, $$S_p^k$$

11 is a fault feature function of a $k^{th}$ piece of data in the $p^{th}$ fault type, and a meaning of the fault feature function is a data point formed by weight fusion of different spectrum features.

The purpose of this step is to perform weighted fusion on the fault features from the different spectra to form data points containing a plurality of spectrum diagnostic features. The meaning of each data point is a fusion of diagnosis effects of different frequency domain analysis methods on the same data, which facilitates subsequent classification processing.

Step S500: weights of the 4 fault features are optimized through a criterion that a fisher discrimination ratio maximizes an intra-class spacing and minimizes an inter-class spacing, to obtain an optimal weight combination of 4 classes of spectrum fault features in the fault feature dataset, and meanwhile a numerical interval formed by the data points after fusion of the different fault types is obtained to form an experience range for judging the fault types.

The core idea of the fisher discrimination ratio in this step is to seek the best projection direction, which may maximize each class spacing after projection and minimize the intra-class distance in each class, so as to distinguish each fault type to the greatest extent. Therefore, the criterion of the fisher discrimination ratio may be represented as follows:

$$C = \sum_{p=1}^{P}\sum_{l\neq p}^{P}\frac{(m_p - m_l)^2}{s_p^2 + s_l^2} = \frac{\omega^T S_b \omega}{\omega^T S_w \omega},$$

in the formula, P represents P kinds of different fault types, $\omega$ is a projection direction, that is a weight matrix of a fusion spectrum, where $\omega=[\omega_1, \omega_2, \dots \omega_M]^T$, $m_p$ and $m_l$ represent an intra-class mean value of a $p^{th}$ class, and an intra-class mean value of an $l^{th}$ class respectively, $s_p$ and $s_l$ represent an intra-class variance of the $p^{th}$ class, and an intra-class variance of the $l^{th}$ class respectively, $S_b$ represents a total inter-class dispersion matrix, and $S_w$ represents a total intra-class dispersion matrix.

Therefore, solving of the optimal weight in step S500 may be disassembled into the following several sub-steps:

S501: the total intra-class dispersion matrix $S_w$ after projection is solved according to an intra-class mean value and each intra-class data point of the fault feature set $\Gamma$:

$$S_w = \sum_{p=1}^{P} v_p$$

$$v_p = \sum_{k=1}^{K}\left(S_p^k - m_p\right)\left(S_p^k - m_p\right)^T$$

in the formula, $v_p$ represents an intra-class dispersion of a $p^{th}$ class of fault data, and the fault feature function constructed in step S400 is substituted into the above formula to obtain:

$$v_p = \sum_{k=1}^{K}\left(\sum_{m=1}^{M}\omega_m h_{m,p}^k - \frac{\sum_{k=1}^{K}\sum_{m=1}^{M}\omega_m h_{m,p}^k}{K}\right)\left(\sum_{m=1}^{M}\omega_m h_{m,p}^k - \frac{\sum_{k=1}^{K}\sum_{m=1}^{M}\omega_m h_{m,p}^k}{K}\right)^T =$$

12

-continued $$\frac{\omega^T}{K}\left(\sum_{k=1}^{K}(KU_{p,k} - \Lambda_p 1)(KU_{p,k} - \Lambda_p 1)^T\right)\omega$$

$$\Lambda_p = \begin{bmatrix} f_{1,p,1} & f_{1,p,2} & \cdots & f_{1,p,k} \\ f_{2,p,1} & & & f_{2,p,k} \\ \cdots & & & \cdots \\ f_{M,p,1} & f_{M,p,2} & \cdots & f_{M,p,k} \end{bmatrix}$$

where, $U_{p,k}=[h_{1,p,k}, h_{2,p,k}, \dots, h_{M,p,k}]^T$ and $1=[1, 1, \dots 1]^T$ are column vectors with elements being 1;

S502: the total inter-class dispersion matrix $S_b$ after projection is solved according to the intra-class mean value and each intra-class data point of the fault feature set $\Gamma$:

$$S_b = \sum_{p=1}^{P}\sum_{l\neq p}^{P}(m_p - m_l)(m_p - m_l)^T$$

$$S_b = \sum_{p=1}^{P}\sum_{l\neq p}^{P}\left(\frac{\sum_{k=1}^{K}S_p^k - \sum_{k=1}^{K}S_l^k}{K}\right)\left(\frac{\sum_{k=1}^{K}S_p^k - \sum_{k=1}^{K}S_l^k}{K}\right)^T =$$

$$\sum_{p=1}^{P}\sum_{l\neq p}^{P}\left(\frac{\sum_{k=1}^{K}\sum_{m=1}^{M}\omega_m h_{m,p}^k - \sum_{k=1}^{K}\sum_{m=1}^{M}\omega_m h_{m,p}^k}{K}\right)$$

$$\left(\frac{\sum_{k=1}^{K}\sum_{m=1}^{M}\omega_m h_{m,p}^k - \sum_{k=1}^{K}\sum_{m=1}^{M}\omega_m h_{m,p}^k}{K}\right)^T =$$

$$\frac{1}{K^2}\sum_{p=1}^{P}\sum_{l\neq p}^{P}\left(\sum_{k=1}^{K}\sum_{m=1}^{M}\omega_m h_{m,p}^k - \sum_{k=1}^{K}\sum_{m=1}^{M}\omega_m h_{m,p}^k\right)$$

$$\left(\sum_{k=1}^{K}\sum_{m=1}^{M}\omega_m h_{m,p}^k - \sum_{k=1}^{K}\sum_{m=1}^{M}\omega_m h_{m,p}^k\right)^T = \frac{1}{K^2}\omega^T\left(\sum_{p=1}^{P}\sum_{l\neq p}^{P}(\Lambda_p - \Lambda_l)(\Lambda_p - \Lambda_l)^T\right)\omega$$

and S503: an optimal projection direction $\omega^T$ is solved, that is a maximum value of a discrimination ratio c is searched, in order to solve the discrimination ratio c, a Lagrange operator $\lambda$ is introduced here, and solving of the discrimination ratio C may be converted into:

$$\max_{\omega}\left(\omega^T S_b \omega\right), \text{ s.t. } \omega^T S_w \omega = c \neq 0$$

$$L(\omega, \lambda) = \omega^T S_b \omega - \lambda\left(\omega^T S_b \omega - c\right)$$

after solving a partial derivative of w, the following formula is obtained:

$$S_b \omega^* - \lambda S_w \omega^* = 0$$

hereby, an optimal projection direction is obtained, that is, an optimal spectrum weight $\omega^*$, since data after dimensionality reduction on the data points loses its original physical meaning, and it only represents a discrimination classification result, and normalization processing needs to be performed on the optimal spectrum weight, to obtain the most suitable spectrum weight combination $w^*$ on the data set.

In this step, the numerical interval formed by the data points after the different fault types are fused is obtained to form the experience range. The optimal fusion data pint obtained after acquiring the optimal spectrum weight $\omega^*$ may be represented as:

$$St_p^k = \sum_{m=1}^{M} \omega_m \times h_{m,p}^k = \omega^* \cdot U_{p,k}$$

for the $p^{th}$ class of faults, a mean value of the fusion data points of the $p^{th}$ class of faults is $$\bar{m}_p = \frac{\sum_{k=1}^{K} St_p^k}{K},$$

and an interval range in which the data points fall after the faults are fused may be represented by minimum and maximum values of the data points of the faults, that is, an interval of the fusion data points of the $p^{th}$ class of faults may be represented as $$\lambda_p = \left[\min\left(St_p^k\right), \max\left(St_p^k\right)\right].$$

S600, data to be diagnosed is input, analysis of the Fourier spectrum, the envelope spectrum, the power spectrum, and the fast spectral kurtosis-square envelope spectrum is performed on the data, then weight fusion is performed on the data according to the optimal weight combination to form a fusion spectrum, the fault features of the 4spectra are extracted, weight fusion is performed to form the data points, fault types of the data points are judged according to the experience range obtained in step S500, and finally fault diagnosis of the high-speed electric multiple-unit bearing is implemented.

The fusion spectrum obtained in the step needs to perform analysis of four kinds of spectra of the Fourier spectrum, the envelope spectrum, the power spectrum, and the fast spectral kurtosis-square envelope spectrum, frequency domain sequences after amplitude normalization on the four kinds of spectra are denoted as $X_1(f)$, $X_2(f)$, $X_3(f)$ and $X_4(f)$ respectively, where f represents a corresponding frequency of the frequency domain sequences, and the fusion spectrum is denoted as:

$$X(f) = \sum_{m=1}^{M} w_m^* \cdot X_m(f)$$

where, M is 4, $$w^* = [w_1^*, w_2^*, \ldots, w_m^*, \ldots, w_M^*],$$

and fault diagnosis of a high-speed rail bogie bearing is implemented by judging a fault feature frequency amplitude in the fusion spectrum.

Discrimination of the fault types obtained in the step is judged by the interval in which the fusion data points fall.

When spectrum analysis of the newly input data is performed and the a fusion data point $S_{test}$ falls in an interval $\lambda_p$, it is judged that the data is of the $p^{th}$ class of fault type, if fusion numerical value intervals of different types of faults overlap, and a newly input data point just falls in the overlapping interval, a relatively-close point may be selected as a judgment conclusion according to an absolute value of a difference value between the fusion data points and the mean value $\bar{m}_p$, and when $S_{test}$ falls in the overlapping interval $p, l \in [1, P]$ of a fusion data interval $\lambda_p$ of the $p^{th}$ class of faults and a fusion data interval $\lambda_l$ of the $l^{th}$ class of faults, if $|S_{test} - \bar{m}_l| < |S_{test} - \bar{m}_p|$, a fault is judged to be the $l^{th}$ class of faults, otherwise, the fault is judged to be the $p^{th}$ class of faults.

The present embodiment defines the fusion spectrum fault diagnosis method for the high-speed electric multiple-unit bearing, which can not only adaptively assign weights to the spectra of different diagnosis effects and form the fusion spectrum according to working conditions of the data set, but also judge the fault types to which the data belongs according to the numerical values of the fusion data points of the newly input data.

Figure 2:
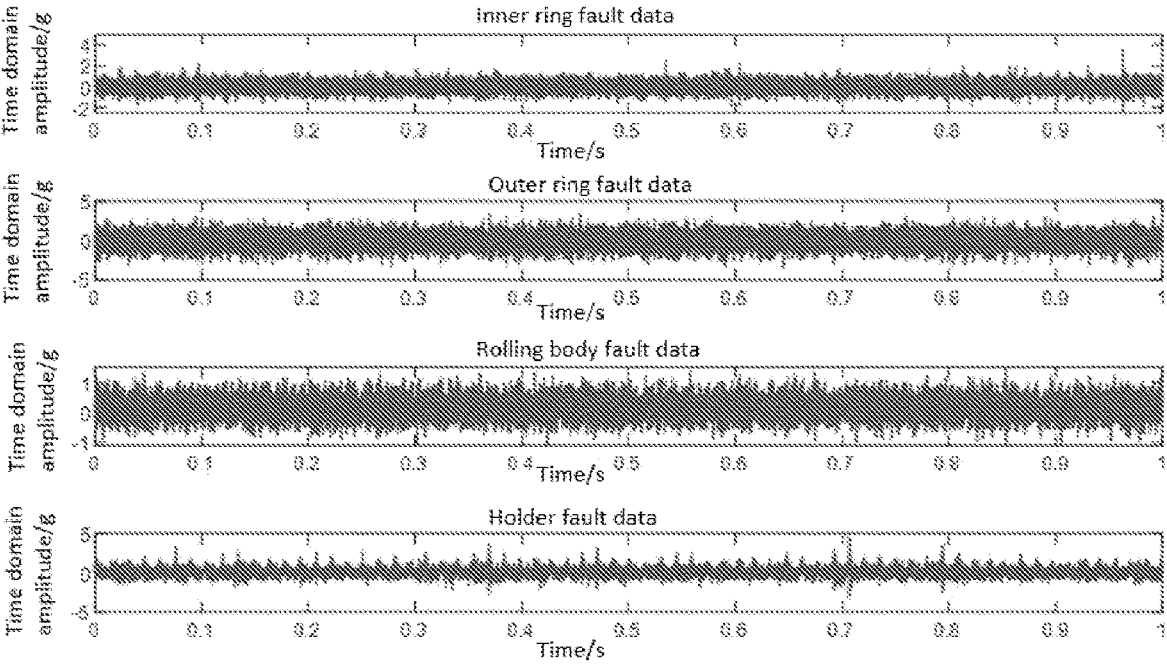
FIG. 2 is time domain signal display of part of experiment data of one embodiment of the present disclosure.
Figure 3:
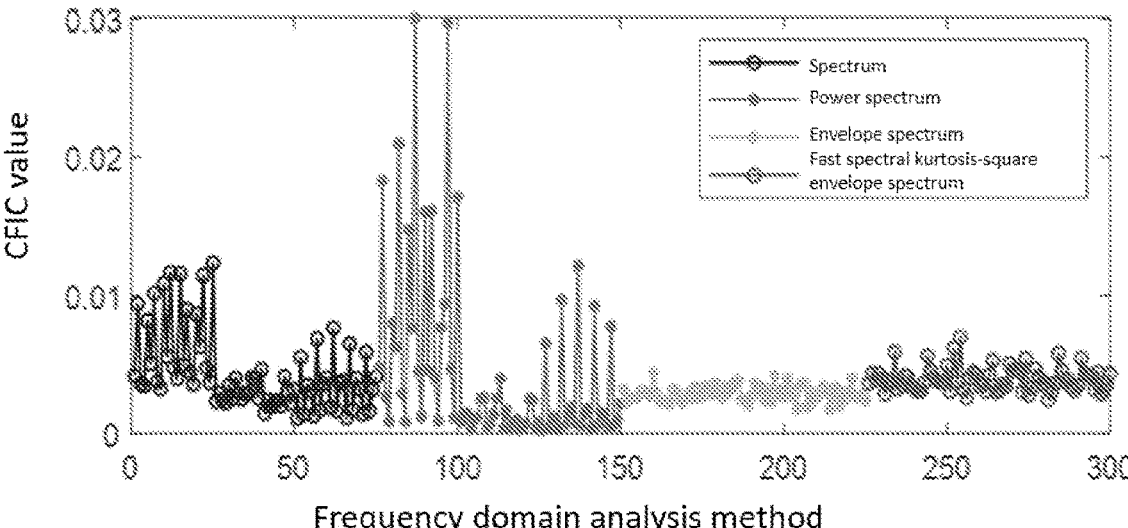
FIG. 3 is diagnosis effect display of a frequency domain analysis method on the experiment data according to the present disclosure.
Figure 4:
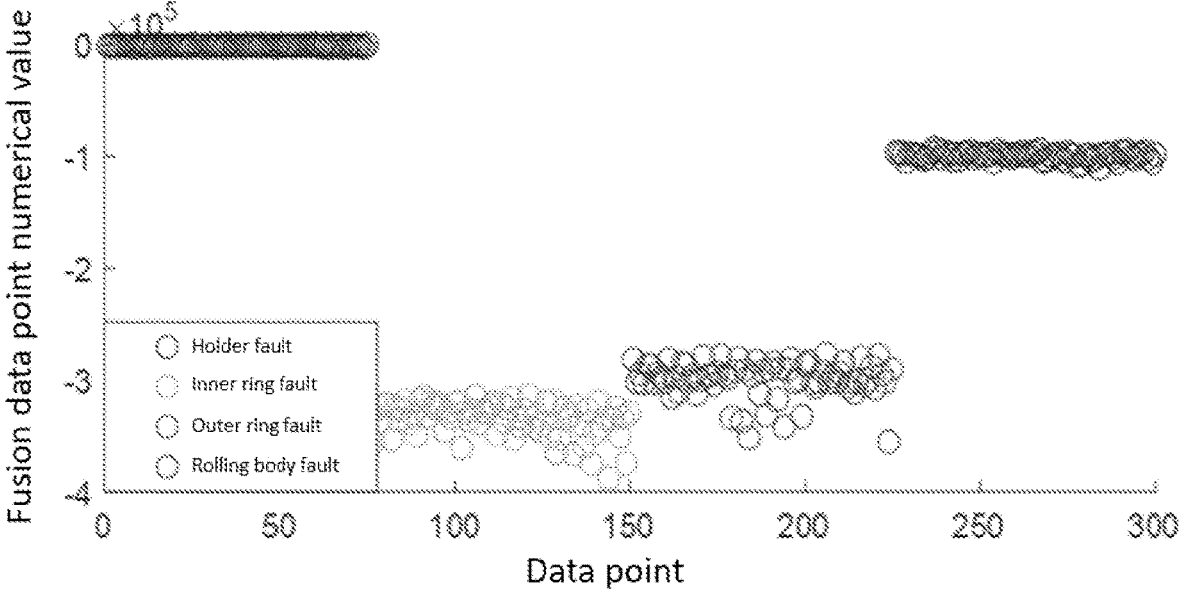
FIG. 4 represents an experiment range of fusion data points for each fault type in an experiment data set according to the present disclosure.
Figure 5:
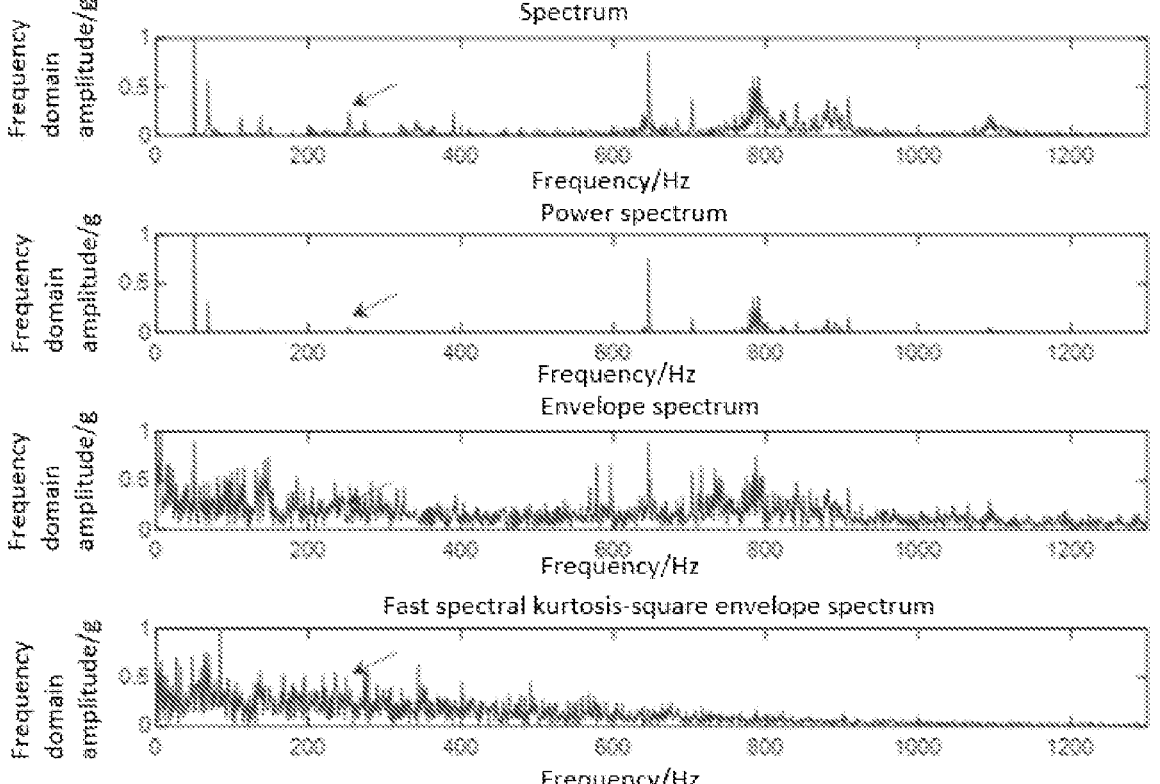
FIG. 5 is time domain signal display of one data to be diagnosed and time domain signal display after analysis of a spectrum, a power spectrum, an envelope spectrum and a fast spectral kurtosis-square envelope spectrum respectively according to the present disclosure.
Figure 6:
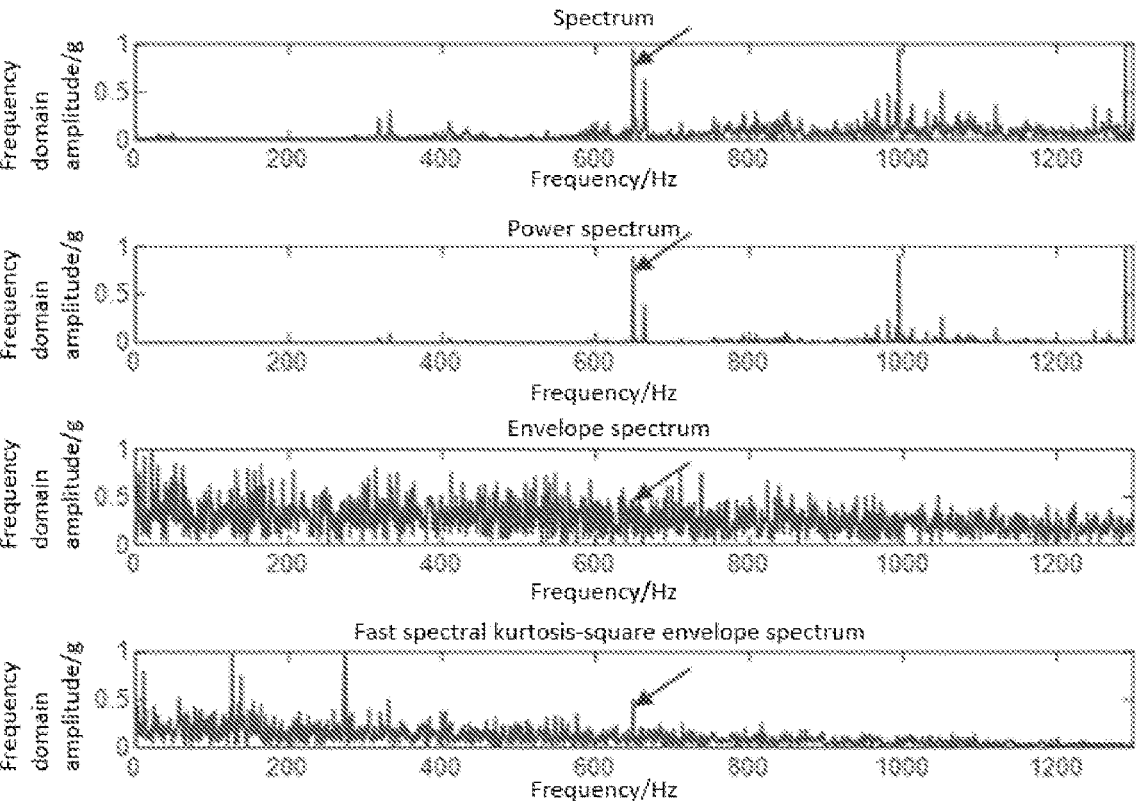
FIG. 6 is time domain signal display of another data to be diagnosed and time domain signal display after analysis of a spectrum, a power spectrum, an envelope spectrum and a fast spectral kurtosis-square envelope spectrum respectively according to the present disclosure.
Figure 7:
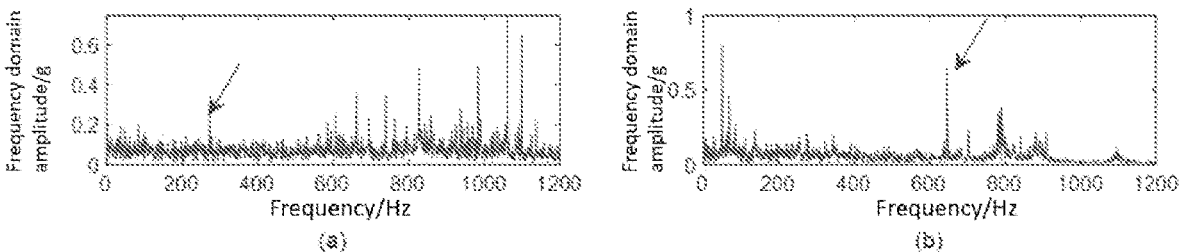
FIG. 7 is fusion spectrum result display of one data to be diagnosed according to the present disclosure.
Figure 8:
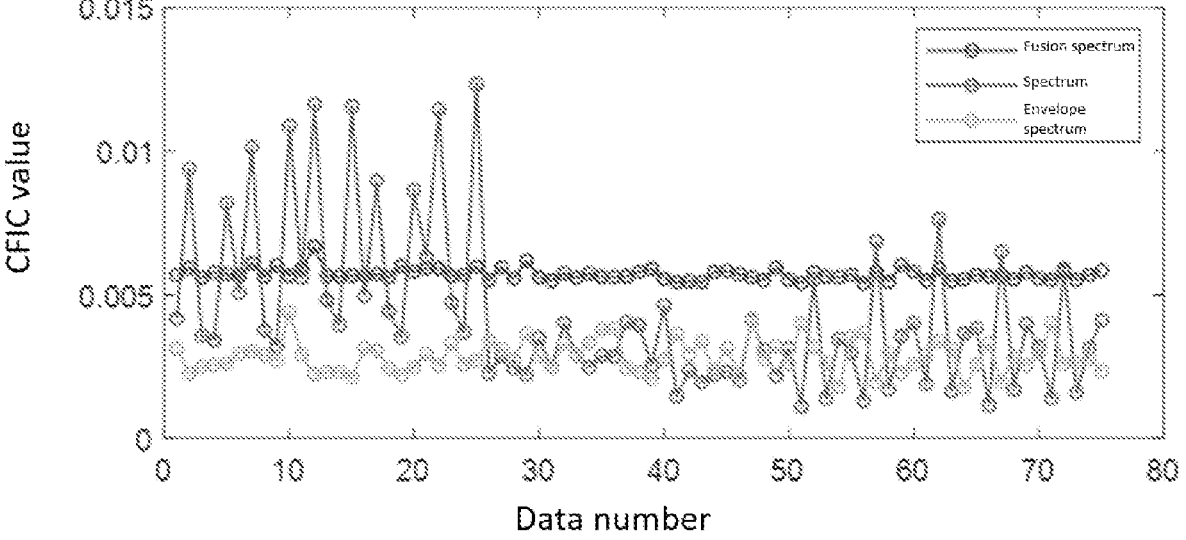
FIG. 8 is display of a comparative result of the present disclosure and other frequency domain methods on the same experiment data set.

FIG. 2 is time domain signal display of part of experiment data of one embodiment of the present disclosure. The experiment data contains 4 classes of faults, each class of fault data contains 75 groups of data, sampling time of each group of data is 1s, and 1 group of data is selected from each group of fault types for display in the figure. FIG. 3 is diagnosis effect display of a frequency domain analysis method on the experiment data according to the present disclosure, including four frequency domain analysis methods, respectively the spectrum, the power spectrum, the envelope spectrum and the fast spectral kurtosis-square envelope spectrum, and its meaning is diagnosis effects of different spectrum analysis methods on the data used in the experiment. FIG. 4 represents an experiment range of fusion data points for each fault type in an experiment data set according to the present disclosure, including four fault types: an inner ring fault, an outer ring fault, a rolling body fault and a holder fault. FIG. 5 is time domain signal display of one data to be diagnosed and time domain signal display after analysis of a spectrum, a power spectrum, an envelope spectrum and a fast spectral kurtosis-square envelope spectrum respectively according to the present disclosure. and fast spectral kurtosis-square envelope spectrum analysis respectively. FIG. 6 is time domain signal display of another data to be diagnosed and time domain signal display after analysis of a spectrum, a power spectrum, an envelope spectrum and a fast spectral kurtosis-square envelope spectrum respectively according to the present disclosure. FIG. 7 is a fusion spectrum result of one data to be diagnosed according to the present disclosure, which is obtained by weighing the spectrum, the power spectrum, the envelope spectrum, and fast spectral kurtosis-square envelope spectrum of the data to be diagnosed according to the optimal weight obtained by the present disclosure. FIG. 8 is a comparison between the present disclosure and other frequency domain analysis methods on the same experiment data set, including a comparison between the stability of the diagnosis effects of the present disclosure and the envelope spectrum and the spectrum to verify the robustness and anti-interference of the present disclosure.

Specifically, the experiment effect verification and the effect comparison are mainly aimed at the analysis and the comparison of CFIC evaluation indicators, the meaning of which is the clarity of a fault feature frequency in the spectra, which may be used for representing the diagnosis effect of the spectra. The definition of the CFIC is: CFIC=amplitudes of the fault feature frequency and its frequency multiplier in the spectra and/the sum of the amplitudes of all frequencies in the spectra. When the fault feature frequency in the spectra is clearer in the whole spectra, the larger the CFIC value is, the better the diagnosis effect of the spectrum is.

In the preferred example of the multi-spectrum fusion decision fault diagnosis method for the high-speed electric multiple-unit bearing, the data used is a group of traction motor bearing data, which is a prefabricated fault experiment with four classes of fault types of the inner ring fault, the outer ring fault, the rolling body fault and the holder fault performed under a rotating speed condition of 4100 rpm. The bearing model is NU214. The fault feature frequency of each position at the rotating speed of 4100 rpm is shown as Table 1.

TABLE 1

| Fault position | Inner ring | Outer ring | Rolling body | Holder |
|---|---|---|---|---|
| Fault feature frequency | 619.57 | 473.75 | 251.67 | 26.1 | selected for analysis, as shown in Table 2. The data set constructed from this is shown in the figure.

TABLE 2

| Fault type | Data volume | Data duration |
|---|---|---|
| Inner ring fault | 75 groups | 1 s |
| Outer ring fault | 75 groups | 1 s |
| Rolling body fault | 75 groups | 1 s |
| Holder fault | 75 groups | 1 s |

The above data set is simplified according to the step S300, and the obtained fault feature data set is partly shown as Table 3.

TABLE 3

| Fault type | Spectrum | Power spectrum | Envelope spectrum | Fast spectral kurtosis-square envelope spectrum |
|---|---|---|---|---|
| Inner ring fault | 26240.46986 | 2368.272953 | 191223.3808 | 628166.7769 |
| | 67276.93627 | 2377.607588 | 376523.5572 | 40072.15936 |
| | 47487.35668 | 1404.72127 | 196740.1997 | 861172.0281 |
| | 25303.68906 | 334.593432 | 355193.3283 | 91394.85138 |
| | 80395.36453 | 4017.964376 | 209753.6648 | 562271.2158 |
| | 21986.73369 | 351.2331881 | 234254.4274 | 641642.9219 |
| | 68015.6184 | 2425.165212 | 343937.7028 | 21172.5859 |
| | 46563.86547 | 1254.839292 | 210728.5369 | 532320.7335 |
| | 22108.1852 | 257.443797 | 340663.3199 | 92881.17668 |
| | 70866.94504 | 939.7028633 | 313017.0286 | 124346.3573 |
| | . . . | . . . | . . . | . . . |
| Outer ring fault | 33550.84251 | 1067.528809 | 250832.3656 | 500021.3536 |
| | 304967.2219 | 102126.8471 | 304468.964 | 111880.8534 |
| | 43838.88916 | 1777.703363 | 263486.4018 | 198770.2839 |
| | 98132.17038 | 10293.90837 | 345376.4988 | 125129.772 |
| | 15721.8897 | 220.2773699 | 154778.8344 | 823747.1867 |
| | 31047.03968 | 927.9619372 | 189236.481 | 558433.8182 |
| | 364833.2182 | 146339.4 | 311658.1027 | 40278.05495 |
| | 31417.06189 | 890.405166 | 226380.9981 | 283376.4123 |
| | 119489.3583 | 15284.04784 | 308135.6096 | 75213.75259 |
| | 19390.28923 | 337.3682025 | 231781.6402 | 542712.8916 |
| | . . . | . . . | . . . | . . . |
| Rolling body fault | 32006.03758 | 65929.32046 | 85929.32046 | 71558.32193 |
| | 22964.84243 | 52790.55577 | 82790.55577 | 106755.9463 |
| | 37342.35272 | 68767.34954 | 68767.34954 | 152667.6245 |
| | 6823.466055 | 128615.4622 | 88615.46224 | 128980.9664 |
| | 17381.76733 | 59822.61048 | 59822.61048 | 184981.4427 |
| | 32478.05926 | 80528.12418 | 80528.12418 | 78398.04682 |
| | 27033.24127 | 95407.2903 | 95407.2903 | 59783.62418 |
| | 29682.17889 | 100070.8356 | 100070.8356 | 70414.60027 |
| | 5431.371807 | 120560.1302 | 90560.13017 | 26338.94067 |
| | 18827.47196 | 105781.3286 | 85781.32856 | 114795.5821 |
| | . . . | . . . | . . . | . . . |
| Holder fau | 852.862754 | 131.9393834 | 16565.02676 | 21157.6592 |
| | 732.893499 | 125.4413316 | 19390.1675 | 7947.86201 |
| | 526.0584755 | 11.65033384 | 20419.58084 | 8951.588108 |
| | 968.2235281 | 288.2783756 | 23451.28649 | 18489.0403 |
| | 1039.45356 | 222.6292709 | 21930.897 | 14548.56436 |
| | 687.4118986 | 188.2502815 | 25766.74535 | 13793.63693 |
| | 777.5488247 | 180.5736243 | 25822.28709 | 8146.23067 |
| | 328.6232912 | 12.24730239 | 23604.76025 | 10275.36466 |
| | 802.8466152 | 153.6612797 | 24783.45146 | 8747.926443 |
| | 736.6613112 | 129.4124587 | 25276.98018 | 19715.10467 |
| | . . . | . . . | . . . | . . . |

The vibration acceleration signals are collected by the acceleration sensor installed on a bearing sleeve with a sampling frequency of 25600 Hz, and original data is intercepted with is as a data sample, that is, 25600 points in each group of data. 75 groups of data of each fault type are The model is solved according to experiment data in Table 2 and Table 3, the optimal weight combination between the four frequency-domain analysis methods in the data set is obtained, results are shown in Table 4, and the results are consistent with an evaluation of the diagnosis effect of the frequency-domain analysis method in FIG. 3, which may prove the effectiveness of the diagnosis method.

TABLE 4

| Method | Spectrum | Power spectrum | Envelope spectrum | Fast spectral kurtosis-square envelope spectrum |
|---|---|---|---|---|
| Weight | 0.3192 | 0.4145 | 0 | 0.2663 |

A result after the weight obtained by solving the above experiment data fuses the experiment data is shown in FIG. 4, therefore, the experience range of the fusion data points of each fault type is summarized and shown in Table 5, wherein the experience ranges of the fusion data points of the rolling body fault and the holder fault does not overlap with that of other fault types, it may be directly judged according to the fusion data of experiment data, and the experience ranges of the inner ring fault and the outer ring fault overlap in the range of $-3.1\times10^5\square-3.6\times10^5$, and therefore, the fault type of the newly input experiment data may be judged by the center distance between its fusion data points and the two classes of experience ranges, that is, it is judged according to an absolute value of a difference between the fusion data points of the newly input experiment data and $-3.35\times10^5$ (inner ring fault average value and $-2.99\times10^5$ (outer ring fault average value).

TABLE 5

| Fault type | Inner ring fault | Outer ring fault | Rolling body fault | Holder fault |
|---|---|---|---|---|
| Fusion data point range ($\times10^5$) | $-3.8\sim-3.1$ | $-2.7\sim-3.6$ | $-1.1\sim-0.9$ | $-0.3\sim-0.02$ |

In one embodiment, 2 groups of fault data are selected as the data to be diagnosed to verify the effectiveness of the method, and specific data is as shown in Table 6.

TABLE 6

| Serial number | Fault type | Data |
|---|---|---|
| Test 1 | Inner ring fault | $-0.64732$ |
| | | $-0.93221$ |
| | | $-0.43775$ |
| | | $-0.086309$ |
| | | $0.012307$ |
| | | $0.074725$ |
| | | $0.53524$ |
| | | $0.18647$ |
| | | $-0.41768$ |
| | | $-0.23819$ |
| | | . . . |
| Test 2 | Rolling body fault | $0.052208$ |
| | | $0.017828$ |
| | | $0.49503$ |
| | | $-0.042393$ |
| | | $-0.24171$ |
| | | $-0.55142$ |
| | | $0.034381$ |
| | | $0.43031$ |
| | | $-0.12419$ |
| | | $0.47757$ |
| | | . . . |

FIG. 5 and FIG. 6 respectively show spectrum results after spectrum analysis of the spectrum, the power spectrum, the envelope spectrum, and the fast spectral kurtosis-square envelope spectrum on the above data to be diagnosed, it may be seen from the figures that the effect displayed by each method is consistent with an evaluation result in Table 3, with the best power spectrum effect and the highest weight, oppositely, the worst envelope spectrum effect and the lowest weight, and it is proved that that the method is effective. In FIG. 7, weight fusion is performed on the above spectra by the weights preferred in Table 4 to form the fusion spectrum. FIG. 7(*a*) and FIG. 7(*b*) may clearly observe the inner ring fault feature frequency and the rolling body fault feature frequency. Results after fusion on these according to the optimal weights found are shown in Table 7, it is judged according to the interval range in which the fusion results fall, and it may be accurately diagnosed as the inner ring fault and the rolling body fault.

TABLE 7

| Data to be diagnosed | Test 1 | Test 2 |
|---|---|---|
| Fault type | Inner ring fault | Rolling body fault |
| Fusion data point numerical value | $-3.62 \times 10^4$ | $-0.95 \times 10^4$ |
| Fault discrimination result | Inner ring fault | Rolling body fault |

In order to verify the diagnosis superiority of the fusion spectrum, two indexes of an average diagnosis effect and diagnosis stability are used to compare the present disclosure with two methods of the envelope spectrum and the spectrum. The results are shown in FIG. 8 and Table 8. It may be seen from FIG. 8 that the fusion spectrum of the present disclosure can not only obtain the better diagnosis results, but also maintain the stability of diagnosis in different data. Accordingly, the superiority of the present disclosure may be seen from Table 8.

The average diagnosis effect is defined as: average diagnosis effect=(CFIC values of all the frequency spectra and/spectrum number); and diagnosis stability is defined as: diagnosis stability=(variance of the CFIC values of all the frequency spectra).

TABLE 8

| | Average diagnosis effect | Diagnosis stability |
|---|---|---|
| Fusion spectrum | 0.0057 | $4.3 \times 10^{-8}$ |
| Envelope spectrum | 0.0029 | $3.2 \times 10^{-7}$ |
| Spectrum | 0.0043 | $7.7 \times 10^{-6}$ |

Although the embodiments of the present disclosure are described above in combination with the accompanying drawings, the technical solutions of the present disclosure are not limited to two working conditions of different speeds and different loads, but also include other classes of working conditions. The above specific implementation solutions are only schematic and directive, rather than limitation. Under the inspiration of this specification and without deviating from the scope of protection of the claims of the present disclosure, those ordinarily skilled in the art may also make a variety of forms, which are included in the protection of the present disclosure.

What is claimed is:

1. A multi-spectrum fusion decision fault diagnosis method for a high-speed electric multiple-unit bearing, comprising the following steps:

step S100: collecting, by an acceleration sensor, vibration acceleration signals of the high-speed electric multiple-unit bearing, and performing classification according to fault types of the bearing, the fault types totally comprising four classes of an inner ring fault, an outer ring fault, a rolling body fault and a holder fault;

step S200: performing analysis of four kinds of spectra of a Fourier spectrum, an envelope spectrum, a power spectrum and a fast spectral kurtosis-square envelope spectrum on the collected vibration acceleration signals respectively, to obtain a spectrum data set composed of different fault types and different spectrum analysis methods;

step S300: extracting strength of a fault feature frequency corresponding to a fault position from the spectrum data set according to the fault feature frequency of a monitored bearing as fault features, simplifying the spectra in the spectrum data set based on the fault features, to obtain a fault feature data set composed of different fault types and different spectrum analysis methods, each piece of data in the fault feature data set being data based on the fault types respectively, and performing analysis of the Fourier spectrum, the envelope spectrum, the power spectrum, and the fast spectral kurtosis-square envelope spectrum on each piece of data in the fault feature data set, to obtain fault features extracted from the four kinds of spectra;

step S400: constructing a fault feature function by weight fusion of four fault features from the four kinds of spectra, and converting each piece of data in the fault feature data set into a fusion data point representing a fault type and a diagnosis effect of the data;

step S500: optimizing weights of the four fault features through a criterion that a fisher discrimination ratio maximizes an intra-class spacing and minimizes an inter-class spacing, to obtain an optimal weight combination of four classes of spectrum fault features in the fault feature dataset, and meanwhile obtaining a numerical value interval formed by fusion data points after fusion of the different fault types to form an experience range for judging the fault types; and step S600: inputting test data, performing analysis of the Fourier spectrum, the envelope spectrum, the power spectrum, and the fast spectral kurtosis-square envelope spectrum on the test data, then performing weight fusion on the test data according to the optimal weight combination to form a fusion spectrum, extracting the fault features of the four kinds of spectra and performing weight fusion to form fusion data points, judging fault types of the fusion data points according to the experience range, and finally implementing fault diagnosis of the high-speed electric multiple-unit bearing.

2. The method according to claim 1, wherein in step S200, the spectrum data set is represented as:

$$\Theta_p = \left\{ \begin{array}{c} X_{1,p}^1(f), \dots, X_{1,p}^k(f), \dots, X_{1,p}^K(f) \\ X_{2,p}^1(f), \dots, X_{2,p}^k(f), \dots, X_{2,p}^K(f) \\ \dots \\ X_{m,p}^1(f), \dots, X_{m,p}^k(f), \dots, X_{m,p}^K(f) \\ \dots \\ X_{M,p}^1(f), \dots, X_{M,p}^k(f), \dots, X_{M,p}^K(f) \end{array} \right\}$$

$$\Theta = \{\Theta_1, \Theta_2, \dots, \Theta_P\}$$

where, p represents a $p^{th}$ fault type, m represents an $m^{th}$ spectrum analysis method, representing four methods of analysis of the Fourier spectrum, the envelope spectrum, the power spectrum, and the fast spectral kurtosis-square envelope spectrum, k represents a $k^{th}$ piece of data under each fault type, where m=1, 2, . . . , M, p=1, 2, . . . , P, and k=1, 2, . . . , K, $\Theta_p$ represents a spectrum data set formed by data of the $p^{th}$ fault type, a frequency domain sequence after spectrum analysis on a $k^{th}$ group of data by adopting the $m^{th}$ method is denoted as $$X_m^k(f), f = 1, \dots N, f$$

is a sequence number of the vibration acceleration signals, a length of the sequence number is N, and meanwhile, in order to avoid an influence of a difference of spectrum magnitude orders of different methods on results, normalization processing is performed on the spectra.

3. The method according to claim 2, wherein in step S300, a step of extracting fault features of corresponding positions of the spectra from the spectrum data set to construct the fault feature data set is as follows:

a fault feature frequency of the bearing at a monitoring position is $f_p$, p=1, . . . P, and for a spectrum $$X_{m,p}^k(f)$$

a fault feature $$h_{m,p}^k$$

extracted from the spectrum is:

$$h_{m,p}^k = \sum_{l=1}^{L} a_p^l \times f_p^2,$$

where, $$a_p^l$$

is an amplitude of an $l^{th}$ harmonic wave of the fault feature frequency $f_p$, L is the number of frequency multiplications to be detected, $$h_{m,p}^k$$

is the fault feature extracted from a spectrum of the $k^{th}$ group of data of the $m^{th}$ method in the $p^{th}$ fault, and the spectrum data set $\Theta$ is simplified as:

$$\Gamma_p = \left\{ \begin{array}{c} h_{1,p}^1, h_{1,p}^2, \dots, h_{1,p}^k, \dots h_{1,p}^K \\ h_{2,p}^1, h_{2,p}^2, \dots, h_{2,p}^k, \dots h_{2,p}^K \\ \dots \\ h_{m,p}^1, h_{m,p}^2, \dots, h_{m,p}^k, \dots h_{m,p}^K \\ \dots \\ h_{M,p}^1, h_{M,p}^2, \dots, h_{M,p}^k, \dots h_{M,p}^K \end{array} \right\}$$

$$\Gamma = \{\Gamma_1, \Gamma_2, \dots, \Gamma_p, \dots \Gamma_P\},$$

where, $\Gamma_p$ represents a $p^{th}$ fault feature data set extracted from a $p^{th}$ fault type spectrum data set $\Theta_p$, and $\Gamma$ represents a simplified global fault feature dataset.

4. The method according to claim 3, wherein in step S400, the constructed fault feature function is represented as:

$$S_p^k = \sum_{m=1}^{M} \omega_m \times h_{m,p}^k \qquad 5$$

where, $$S_p^k$$

is a fault feature function of a $k^{th}$ piece of data in the $p^{th}$ fault type, and a meaning of the fault feature function is a fusion data point formed by weight fusion of different spectrum features.

5. The method according to claim 4, wherein in step S500, the criterion of the fisher discrimination ratio is represented as:

$$C = \sum_{p=1}^{P}\sum_{l \neq p}^{P} \frac{(m_p - m_l)^2}{s_p^2 + s_l^2} = \frac{\omega^T S_b \omega}{\omega^T S_w \omega}, \qquad 25$$

in the formula, P represents P kinds of different fault types, $\omega$ is a projection direction, that is a weight matrix of the fusion spectrum, where $\omega = [\omega_1, \omega_2, \ldots \omega_M]^T$, $m_p$ and $m_l$ represent an intra-class mean value of a $p^{th}$ class and an intra-class mean value of an $l^{th}$ class respectively, $s_p$ and $s_l$ represent an intra-class variance of the $$S_w = \sum_{p=1}^{P} v_p$$

$$v_p = \sum_{k=1}^{K} (S_p^k - m_p)(S_p^k - m_p)^T$$

where, in the formula, $v_p$ represents an intra-class dispersion of a $p^{th}$ class of fault data, and the fault feature function is substituted into the above formula to obtain:

$$v_p = \sum_{k=1}^{K}\left(\sum_{m=1}^{M}\omega_m h_{m,p}^k - \frac{\sum_{k=1}^{K}\sum_{m=1}^{M}\omega_m h_{m,p}^k}{K}\right)\left(\sum_{m=1}^{M}\omega_m h_{m,p}^k - \frac{\sum_{k=1}^{K}\sum_{m=1}^{M}\omega_m h_{m,p}^k}{K}\right)^T$$

$$= \frac{\omega^T}{K}\left(\sum_{k=1}^{K}(KU_{p,k} - \Lambda_p 1)(KU_{p,k} - \Lambda_p 1)^T\right)\omega$$

$$\Lambda_p = \begin{bmatrix} f_{1,p,1} & f_{1,p,2} & \cdots & f_{1,p,k} \\ f_{2,p,1} & & & f_{2,p,k} \\ \cdots & & & \cdots \\ f_{M,p,1} & f_{M,p,2} & \cdots & f_{M,p,k} \end{bmatrix}$$

where, $U_{p,k} = [h_{1,p,k}, h_{2,p,k}, \ldots, h_{M,p,k}]^T$ and $1 = [1, 1, \ldots 1]^T$ are column vectors with elements being 1;

S502: solving the total inter-class dispersion matrix $S_b$ after projection according to the intra-class mean value and each intra-class data point of the fault feature set $\Gamma$:

$$S_b = \sum_{p=1}^{P}\sum_{l \neq p}^{P}(m_p - m_l)(m_p - m_l)^T$$

$$S_b = \sum_{p=1}^{P}\sum_{l \neq p}^{P}\left(\frac{\sum_{k=1}^{K}S_p^k - \sum_{k=1}^{K}S_l^k}{K}\right)\left(\frac{\sum_{k=1}^{K}S_p^k - \sum_{k=1}^{K}S_l^k}{K}\right)^T$$

$$= \sum_{p=1}^{P}\sum_{l \neq p}^{P}\left(\frac{\sum_{k=1}^{K}\sum_{m=1}^{M}\omega_m h_{m,p}^k - \sum_{k=1}^{K}\sum_{m=1}^{M}\omega_m h_{m,p}^k}{K}\right)\left(\frac{\sum_{k=1}^{K}\sum_{m=1}^{M}\omega_m h_{m,p}^k - \sum_{k=1}^{K}\sum_{m=1}^{M}\omega_m h_{m,p}^k}{K}\right)^T$$

$$= \frac{1}{K^2}\sum_{p=1}^{P}\sum_{l \neq p}^{P}\left(\sum_{k=1}^{K}\sum_{m=1}^{M}\omega_m h_{m,p}^k - \sum_{k=1}^{K}\sum_{m=1}^{M}\omega_m h_{m,p}^k\right)\left(\sum_{k=1}^{K}\sum_{m=1}^{M}\omega_m h_{m,p}^k - \sum_{k=1}^{K}\sum_{m=1}^{M}\omega_m h_{m,p}^k\right)^T$$

$$= \frac{1}{K^2}\omega^T\left(\sum_{p=1}^{P}\sum_{l \neq p}^{P}(\Lambda_p - \Lambda_l)(\Lambda_p - \Lambda_l)^T\right)\omega$$

$p^{th}$ class and an intra-class variance of the $l^{th}$ class respectively, $S_b$ represents a total inter-class dispersion matrix, and $S_w$ represents a total intra-class dispersion matrix.

6. The method according to claim 5, wherein optimizing the weights of the four fault features through the criterion that the fisher discrimination ratio maximizes the intra-class spacing and minimizes the inter-class spacing comprises:

S501: solving the total intra-class dispersion matrix $S_w$ after projection according to an intra-class mean value and each intra-class data point of the fault feature set $\Gamma$:

and S503: solving an optimal projection direction $\omega^T$, seeking a maximum value of a discrimination ratio c, and in order to solve the discrimination ratio c, introducing a Lagrange operator $\lambda$ here, solving of the discrimination ratio C being able to be converted into:

$$\max_{\omega}(\omega^T S_b \omega), \text{ s.t. } \omega^T S_w \omega = c \neq 0$$

$$L(\omega, \lambda) = \omega^T S_b \omega - \lambda(\omega^T S_b \omega - c)$$

and after solving a partial derivative of w, obtaining the following formula:

$$S_b \omega^* - \lambda S_w \omega^* = 0 \qquad 5$$

hereby, obtaining an optimal projection direction, that is, an optimal spectrum weight $\omega^*$, and performing normalization processing on the optimal spectrum weight, to obtain the most suitable spectrum weight combination w* on the fault feature data set.

7. The method according to claim 4, wherein in step S500, the optimal fusion data obtained after acquiring the optimal weight combination is represented as:

$$St_p^k = \sum_{m=1}^{M} \omega_m \times h_{m,p}^k = \omega^* \cdot U_{p,k}$$

for the $p^{th}$ class of faults, a mean value of the fusion data points of the $p^{th}$ class of faults being $$\overline{m}_p = \frac{\sum_{k=1}^{K} St_p^k}{K},$$

and an interval range in which the data points fall after the faults are fused being able to be represented by minimum and maximum values of the data points of the $p^{th}$ class of faults, that is, an interval of the fusion data points of the $p^{th}$ class of faults being able to be represented as $$\lambda_p = \left[ \min(St_p^k), \max(St_p^k) \right].$$

8. The method according to claim 7, wherein in step S600, when spectrum analysis of newly input data is performed and a fusion data point $S_{test}$ falls in an interval $\lambda_p$, it is judged that data is of the $p^{th}$ class of fault type, if fusion numerical value intervals of different types of faults overlap and a newly input data point just falls in an overlapping interval, a relatively-close point may be selected as a judgment conclusion according to an absolute value of a difference value between the fusion data point and the mean value $\overline{m}_p$, and when $S_{test}$ falls in an overlapping interval $p,l \in [1,P]$ of a fusion data interval $\lambda_p$ of the $p^{th}$ class of faults and a fusion data interval $\lambda_l$ of the $l^{th}$ class of faults, if $|S_{test} - \overline{m}_l| < |S_{test} - \overline{m}_p|$, a fault is judged to be the $l^{th}$ class of faults, otherwise, the fault is judged to be the $p^{th}$ class of faults.

9. The method according to claim 1, wherein in step S600, the obtained fusion spectrum needs to perform analysis of four kinds of spectra of the Fourier spectrum, the envelope spectrum, the power spectrum, and the fast spectral kurtosis-square envelope spectrum on input data to be diagnosed respectively, frequency domain sequences after amplitude normalization on the four kinds of spectra are denoted as $X_1(f)$, $X_2(f)$, $X_3(f)$ and $X_4(f)$ respectively, where f represents a corresponding frequency of the frequency domain sequences, and the fusion spectrum is denoted as:

$$X(f) = \sum_{m=1}^{M} w_m^* \cdot X_m(f)$$

where, M is 4, $$w^* = [w_1^*, w_2^*, \ldots, w_m^*, \ldots, w_M^*],$$

and fault diagnosis of a high-speed rail bogie bearing is realized by judging a fault feature frequency amplitude in the fusion spectrum.

\* \* \* \* \*